United States Patent [19]

Lieding

[11] Patent Number: 5,755,482
[45] Date of Patent: May 26, 1998

[54] SELF-LOCKING STAKE FOR SHEET GLASS TRANSPORT SYSTEM

[75] Inventor: Robert K. Lieding, Mequon, Wis.

[73] Assignee: F. Barkow, Inc., Milwaukee, Wis.

[21] Appl. No.: 732,932

[22] Filed: Oct. 17, 1996

[51] Int. Cl.⁶ .......................................... B60P 7/06
[52] U.S. Cl. ............................... 296/43; 410/101
[58] Field of Search ................ 296/43; 410/101, 410/102, 106, 107, 108, 109, 110

[56] References Cited

U.S. PATENT DOCUMENTS

| | | | |
|---|---|---|---|
| 1,398,110 | 11/1921 | Miller | 296/43 |
| 1,535,128 | 4/1925 | Milner | 296/43 |
| 1,543,532 | 6/1925 | Timidaiski | 296/43 |
| 1,926,352 | 9/1933 | Selzer | 296/43 |
| 2,472,234 | 6/1949 | Smith | 296/43 |
| 4,231,610 | 11/1980 | Stoll | 296/43 |
| 4,838,597 | 6/1989 | Berg | 296/43 |
| 5,148,924 | 9/1992 | Mason et al. | 211/41 |

*Primary Examiner*—Jesus D. Sotelo
*Attorney, Agent, or Firm*—Ryan, Maki, Mann & Hohenfeldt

[57] ABSTRACT

A system provides self locking stakes for a load carrying vehicle which includes a load carrying surface on the vehicle with an opening therein for receiving a stake. Each elongated stake has an upper end for retaining a load on the vehicle and a lower end adapted to be received in the opening. A notch on a side of the lower end of the stake has a height at least equal to the thickness of the load carrying surface. A spring carried on either the surface or the stake provides a biasing force urging the stake toward the side provided with the notch, so that the notch engages an edge of the opening thereby securing the stake on the vehicle. Preferably the spring is in the form of an elongated wire spring attached to the stake so that the stake can be removed by manually pushing the stake against the bias of the spring and then extracting the stake.

8 Claims, 3 Drawing Sheets

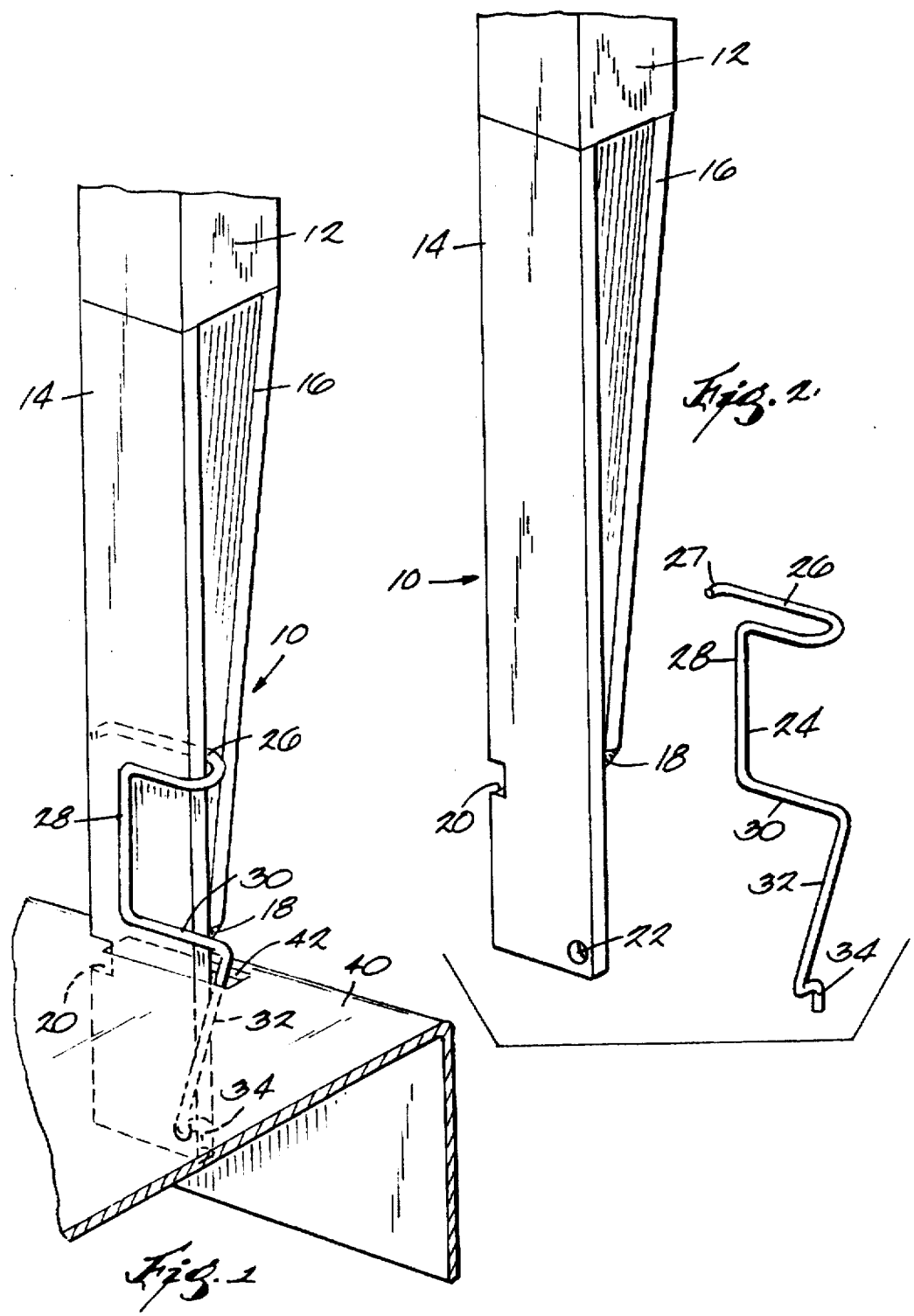

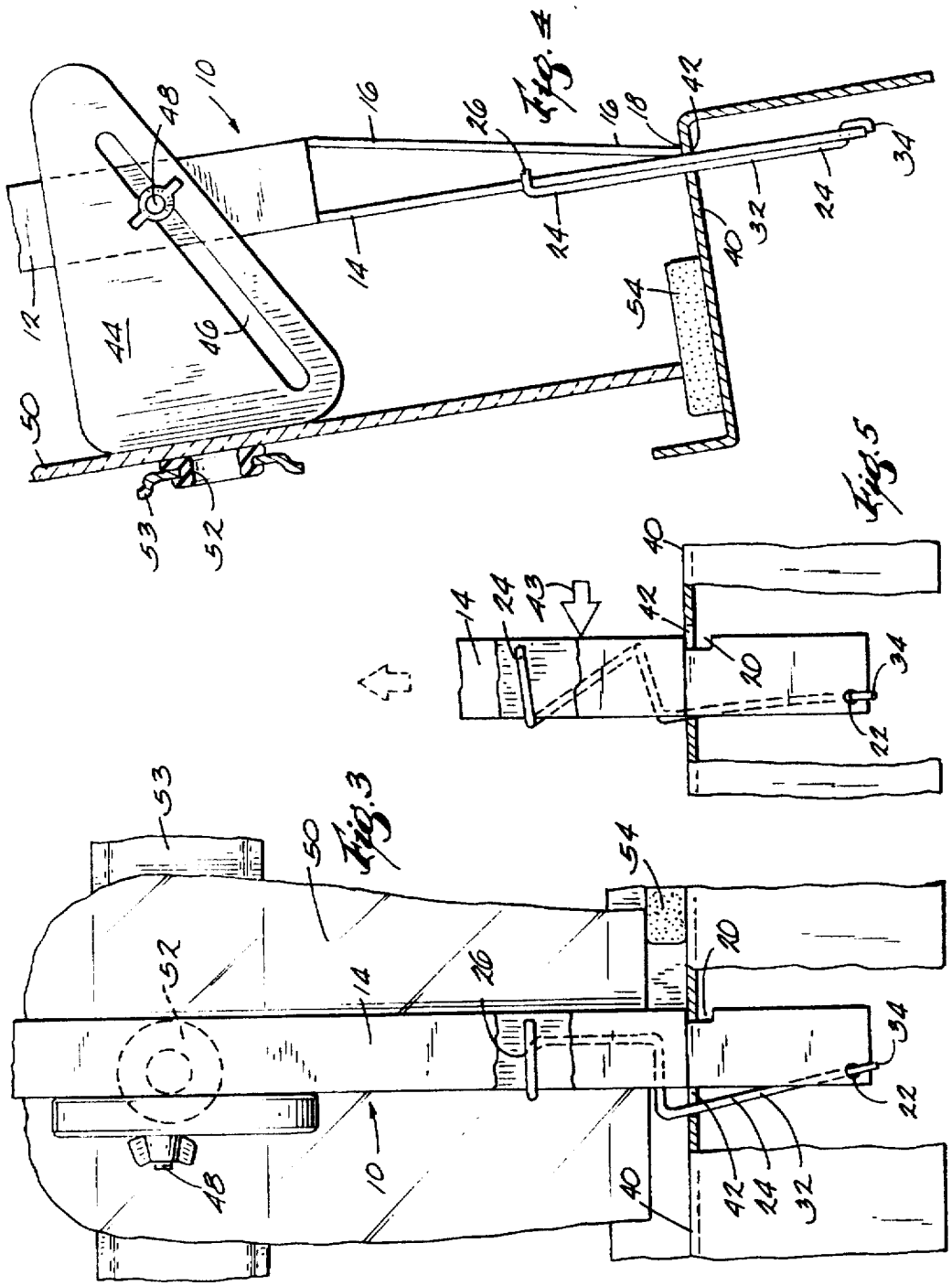

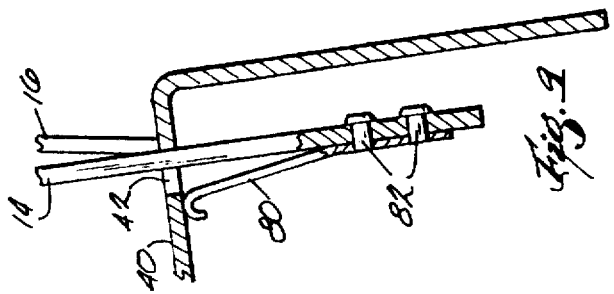
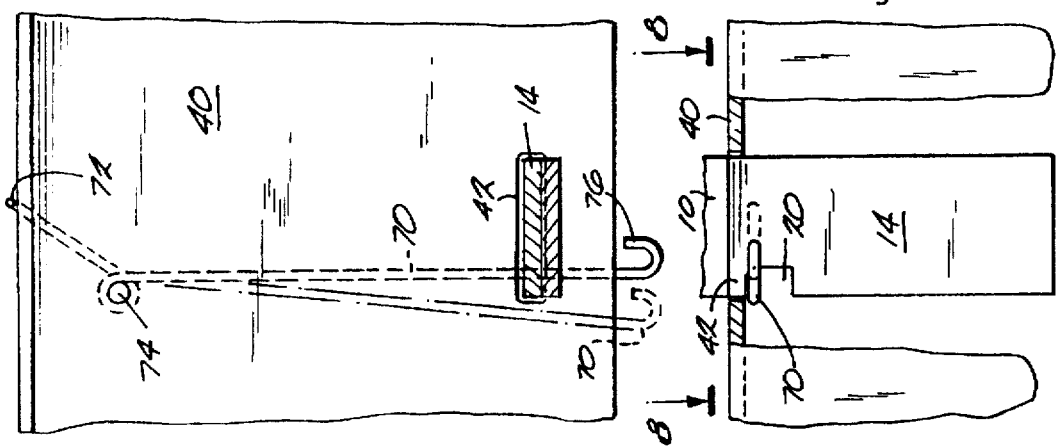
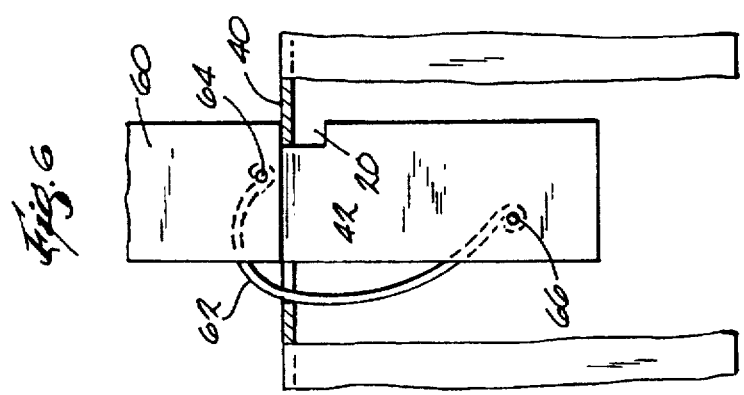

SELF-LOCKING STAKE FOR SHEET GLASS TRANSPORT SYSTEM

BACKGROUND OF THE INVENTION

This invention relates to systems for supporting plate glass on a truck bed or trailer. More particularly, the invention relates to self-locking stakes for a sheet glass transport system.

Various types of self-locking stakes for trucks have been heretofore proposed. See, for example, U.S. Pat. Nos. 1,398,110, 1,535,128, 1,543,532, 1,926,352 and 4,838,597.

Racks on trucks or trailers designed for transporting sheet glass require stakes of substantial length. Heretofore, no satisfactory locking system for such stakes has been devised. When the racks are in use transporting glass, the stakes are wedged, usually with rubber pads or the like so that they will not come loose from the bed of the truck or trailer. However, when the rack is empty, the stakes may work loose from the truck body. In the event a stake is jarred loose from a truck body, it is possible that a stake could be bounced off the glass carrier body and fall into highway traffic. A need has therefore continued to exist for a system which would retain stakes to a truck body or trailer even when empty, yet which would be convenient enough to use, so that use thereof by those involved in transporting glass sheets is not discouraged.

SUMMARY OF THE INVENTION

It is a principal object of the invention to provide an improved system for securing stakes to a load carrying vehicle. While the vehicles contemplated are primarily cargo carrying trucks, trailers or similar motor vehicles, the invention can also be used in conjunction with other load-carrying conveyances such as water craft.

In accordance with an important aspect of the invention, springs are provided to provide a biasing force which secures the stake in a pocket or opening in the load carrying surface of the vehicle. In accordance with this aspect of the invention, a spring can either be provided on the load supporting surface of the vehicle, or more preferably, on the stake itself.

In accordance with a further aspect of the invention, a stake is provided with a notch having a height at least equal to the thickness of either the load carrying surface itself or a projection provided thereon. In accordance with a further related aspect of the invention, a stake is provided which is self securing when inserted into an opening in the load carrying surface.

In accordance with a further related aspect, a stake is provided which can be removed from the opening by manually exerting a sideways force sufficient to overcome the biasing force of the spring.

In accordance with still a further aspect of the invention, a spring can be attached to the load carrying surface, such as a ledgeboard on a truck, to engage the stake when inserted in accordance with an alternative embodiment of the invention. In such event, the stake is released by manipulation of the spring, itself, to relieve the biasing force against the stake.

In accordance with a further aspect of the invention, a wire spring can be provided which is attached at at least one of its ends by insertion through an opening in the stake and at the opposite end either by a similar opening or by wrapping of the end of the spring around at least three sides of the stake.

In accordance with a further related aspect of the invention, rubber pads may be attached to the stake and to the load supporting surface to provide cushioning for transport of glass sheets. In accordance with a still further aspect of the invention, the stake is also provided with a shoulder which engages the load supporting surface adjacent the opening so that the movement of the stake through the opening is limited.

In accordance with still further aspects of the invention, the stakes may be inserted vertically or may tilt toward the center of the load supporting surface of the truck or other vehicle.

Briefly, a system of this invention provides self locking stakes for a load carrying vehicle which includes a load carrying surface on the vehicle with an opening therein for receiving a stake. Each elongated stake has an upper end for retaining a load on the vehicle and a lower end adapted to be received in the opening. A notch on a side of the lower end of the stake has a height at least equal to the thickness of an edge of the opening in the load carrying surface. A spring carried on either the surface or the stake provides a biasing force urging the stake toward the side provided with the notch, so that the notch engages an edge of the opening thereby securing the stake on the vehicle. Preferably the spring is in the form of an elongated wire spring attached to the stake so that the stake can be removed by manually pushing the stake against the bias of the spring and then extracting the stake.

BRIEF DESCRIPTION OF THE DRAWINGS

FIG. 1 is a fragmentary perspective view showing a stake of this invention in conjunction with a ledgeboard of a glass carrier body;

FIG. 2 is a fragmentary perspective view of the stake of FIG. 1 showing the parts disassembled for clarity;

FIG. 3 is a fragmentary side elevational view of the stake and ledgeboard of FIG. 1 further including sheet glass in conjunction therewith;

FIG. 4 is a fragmentary end view of the combination shown in FIG. 3;

FIG. 5 is a fragmentary sectional view through a ledgeboard showing the removal of a stake of this invention therefrom;

FIG. 6 is a fragmentary side view with parts in section showing an alternate embodiment of a stake of this invention in conjunction with a ledgeboard;

FIG. 7 is a fragmentary side view with parts in section showing yet a further embodiment of the invention;

FIG. 8 is a fragmentary top plan view taken along line 8—8 of FIG. 7; and

FIG. 9 is a fragmentary sectional view showing a further embodiment of the invention in conjunction with a ledgeboard.

DETAILED DESCRIPTION OF INVENTION

Referring more particularly to the drawings, there is shown a stake 10 of a type heretofore used for supporting and retaining sheet glass for transport on a truck bed or trailer. Stake 10 includes an upper metallic stake portion which is typically 4 to 9 feet in length dependent on the type and size of glass being transported.

The lower end of stake 10 in the illustrated embodiment includes a flat section 14 and an angled supporting section 16 which terminates in a tapered end 18.

The flattened end 14 of stake 10 is provided with a notch 20 for engagement with an opening in a truck bed or a ledgeboard mounted on a truck or trailer, as will be hereinafter explained. An opening 22 is provided in the preferred embodiment of FIGS. 1–5 to receive one end of a wire spring 24. As best seen in FIGS. 1 and 2, spring 24 is configured so that it has an upper portion 26 shaped so as to lie against the inner side of stake portion 14 and terminates in an end 27 bent at right angles to engage the side of flattened stake portion 14. In the preferred configuration, a vertical segment 28 engages the lower end 14 of stake 10 in a generally axial direction, thus tending to hold the spring 24 in place thereon. Another section 30 at right angles to section 28 joins an angled section 32, the lower end of which supports a hook-shaped end 34 which is adapted to be received in opening 22 at the lower end of stake 10.

A ledgeboard 40 located, for example, on a truck cargo-carrying area, is provided with a slotted opening 42 having a length generally adapted to receive the lower end of flattened stake portion 14. The end 14 of stake 10 can thus be manually inserted into slot 42. During insertion, spring 24 will yield to the left, as viewed in FIG. 1, to enable stake end 14 to be introduced until notch 20 engages the edge of opening 42. As best seen in FIGS. 1 and 3, angled section 32 of spring 24 engages the end of slot 42 opposite notch 20. The stake is thus urged by the bias of spring 24 toward the notched side of stake portion 14, thereby causing notch 20 to be locked on the edge of opening 42.

As seen in FIG. 5, stake 10 can be grasped manually when removal is desired. By applying force in the direction of arrow 43, spring 24 will yield, allowing the stake 10 to be extracted from slot 42 in an upward direction.

The use of stake 10 to hold a sheet of glass 50 in place is best illustrated in FIGS. 4 and 5. In this case, a number of stakes 10 are utilized. A rubber cleat 44 is provided with an elongated slot 46 which receives a bolt 48 passing through the upper portion 12 of stake 10. A sheet of glass is then held between a rubber grommet 52 held in an opening in a supporting bar 53. The sheet of glass 50 is thus compressed between rubber cleat 54 and rubber cleat 52 as is shown in the drawings. The bottom end of glass sheet 50 is supported on another rubber pad 54. As also best seen in FIG. 4, the lower end 18 of angled lower portion 16 of stake 10 engages the side of ledgeboard 40 adjacent to opening 42. Thus, end 18 which is preferably slightly tapered, serves to act as a stop to limit the depth of insertion of stake 10 into slot 42.

In the embodiment of FIG. 6, an alternate form of stake 60 is shown. Stake 60 is provided with a notch 20 similar to stake 10 for the purpose of engaging the edge of the slot 42 in ledgeboard 40. In this case, a curved spring 62 is utilized. The opposite ends of spring 62 are supported in holes 64 and 66 through the lower end of stake 60 either by means of small pins or rivets or, if desired, by simply bending the ends of spring 62 so that they will be adapted to be positioned within holes 64 and 66. While spring 62 is illustrated as being attached to one side of bottom of stake 60, it will be appreciated that the opposite ends of spring 62 can be attached to opposite sides of the end of stake 60. In other respects, the use and operation of stake 60 is similar to that already described to that in stake 10. In the embodiments of FIGS. 7 and 8, in this embodiment there is no spring attached to end 14 of stake 10.

Instead, a spring 70 is attached to ledgeboard 40. One end 72 of spring 70 engages the edge of ledgeboard 40. Spring 70 is attached to the ledgeboard by a pin 74 and is biased toward the right when viewing FIGS. 7 and 8. Thus, when the end 14 of stake 10 is introduced into slot 42, the spring 70 will be deflected to the left as indicated by phantom lines in FIG. 8. After introduction of stake 10, the spring 70 as allowed deflects back into the notch 20 of stake 10. To remove stake 10, the end 76 of spring 70 is again flexed to the left as seen in FIG. 8 to allow removal of the end 14 of stake 10 from slot 42. In other respects, the device of FIGS. 7 and 8 operates in the same manner as already described with regard to stake 10. The embodiment of FIGS. 7 and 8 is equally effective but requires manual movement of spring 70 and thus is less preferred in most applications.

A still further embodiment of the invention is shown in FIG. 9. The embodiment of FIG. 9 also requires manipulation of the device in order to remove it from slot 42. The embodiment of FIG. 9 is thus less preferred than the embodiments of FIGS. 1–6. In the embodiment of FIG. 9 a flat spring 80 is supported on the lower end 14 of a stake by means of rivets 82. The spring 80 must be flattened manually against end 14 of the stake in order to both insert the stake into slot 42 and to remove it therefrom.

While various preferred embodiments of the invention have been shown for purposes of illustration, it will be understood that various modifications thereof may be made by those skilled in the art without departing from the scope of the invention.

I claim:

1. A combination including a self locking stake for a load carrying vehicle comprising a load carrying surface on said vehicle which includes an edge having a first thickness;

an opening in said surface for receiving a stake;

an elongated stake having an upper end for retaining a load on said vehicle and a lower end adapted to be received in said opening;

a notch on a side of said lower end of said stake, said notch having a dimension in a direction generally parallel to the lineal axis of said stake at least equal to said first thickness, a spring carried on one of said surface or said stake, said spring providing a biasing force urging said stake toward the side provided with said notch, whereby said notch engages an edge of said opening thereby securing said stake on said vehicle.

2. A combination according to claim 1 wherein said spring comprises an elongated wire spring attached to said stake and adapted to engage said opening at a side opposite said notch to thereby exert said biasing force.

3. A combination according to claim 1 wherein said spring is a wire spring affixed to said surface and extends across an edge of said opening whereby when said stake is inserted therein, said spring exerts said biasing force on said stake.

4. A combination according to claim 1 wherein rubber pads are attached to said stake and to said surface to provide a cushioning means for transportation thereon of glass sheet material.

5. A combination according to claim 2 wherein said spring has an upper end which surrounds at least three sides of said stake and a lower end which is supported in an opening extending through said stake.

6. A combination according to claim 5 wherein each end of said spring is supported in an opening extending through said stake.

7. A combination according to claim 1 wherein said stake is provided with a shoulder which engages said surface adjacent said opening to thereby limit the movement of said stake through said opening.

8. A combination according to claim 1 wherein said stake can be removed by manually moving said stake against the bias of said spring and thence extracting said stake.

\* \* \* \* \*